United States Patent [19]
Prillard

[11] Patent Number: 5,148,588
[45] Date of Patent: Sep. 22, 1992

[54] PROCESS FOR THE MANUFACTURE OF A FABRIC-COVERED VISOR

[75] Inventor: Charles B. Prillard, Rupt, France

[73] Assignee: Rockwell Automotive Body Systems-France, Paris, France

[21] Appl. No.: 698,633

[22] Filed: May 10, 1991

[30] Foreign Application Priority Data

May 11, 1990 [FR] France .................. 90 05933

[51] Int. Cl.$^5$ ................................. B68G 7/00
[52] U.S. Cl. ......................... 29/91.1; 29/422; 29/451; 296/97.1; 296/97.9
[58] Field of Search .......... 29/439, 422, 451, 91, 29/91.1, 91.5; 296/97.1, 97.9, 97.12

[56] References Cited

U.S. PATENT DOCUMENTS

| | | | |
|---|---|---|---|
| 4,952,008 | 8/1990 | Lobanoff et al. | 29/91.1 |
| 4,982,991 | 1/1991 | Lawassani et al. | 296/97.1 |
| 4,998,767 | 3/1991 | Lawassani et al. | 296/97.1 |
| 5,007,532 | 4/1991 | Binish | 29/91.1 X |
| 5,031,950 | 7/1991 | Miller | 296/97.1 |
| 5,031,951 | 7/1991 | Binish | 29/91.1 X |

FOREIGN PATENT DOCUMENTS

| | | |
|---|---|---|
| 289473 | 2/1988 | European Pat. Off. . |
| 295068 | 12/1988 | European Pat. Off. . |
| 1555805 | 9/1969 | Fed. Rep. of Germany . |
| 3713475 | 10/1988 | Fed. Rep. of Germany . |
| 3744831 | 11/1989 | Fed. Rep. of Germany . |
| 114514 | 5/1989 | Japan . |
| 2194436 | 3/1988 | United Kingdom . |

*Primary Examiner*—Mark Rosenbaum
*Assistant Examiner*—S. Thomas Hughes
*Attorney, Agent, or Firm*—Martin Lukacher

[57] ABSTRACT

The invention relates to a process for the manufacture of a vehicle visor (2), of the type comprising a rigid core (1) enclosed in a fabric cover, according to which a fabric pocket (12) is produced, comprising on one of its sides (13) an opening (14) defined by lips, the core (1) is inserted into the pocket (12) through the opening (14) and the opening (14) is closed to form the cover. According to the invention, the lips (15, 16) of the opening (14) are first of all stiffened and the opening (14) is closed by inserting the stiffened lips (15, 16) into a groove (21) provided on the corresponding edge (6) of the core (1).

8 Claims, 3 Drawing Sheets

PROCESS FOR THE MANUFACTURE OF A FABRIC-COVERED VISOR

This invention relates to a vehicle visor. It relates more particularly to a visor comprising a rigid core enclosed in a fabric cover.

For aesthetic reasons, it is desirable to trim vehicle visors with the same material as that forming the interior upholstery of the vehicle in question and, in particular, with the material covering the inside of the roof. This problem can be solved in a relatively simple manner when the covering consists of a synthetic material, in that the core forming the visor is covered by making use of the bonding or welding possibilities offered by this material.

However, problems arise when the upholstery material is a textile material, e.g. a woven fabric, as woven fabric is not a heat sealing material. In order to obtain a fabric-covered product having an attractive appearance, it is therefore customary to sew the different sections of fabric together, superimposing them upon one another, outer face against outer face, so as to arrange the edges of the sections exterior to the seams on the inside of the cover.

EP-0 289 473 describes a method for producing a visor comprising a rigid core inserted into a cover of textile material comprising an opening on one of its faces. The cover is produced in that two rectangular fabric panels are superimposed upon one another, the two panels are stitched together around the edges thereof, leaving an opening, and the cover is turned inside out. Once the core has been inserted into this cover the opening is closed by an additional element, e.g. a mirror.

The opening is large to allow for the insertion of the core, especially if the fabric is not very extensible. Therefore, this process can only be used when the visor comprises a mirror or a conventional element to obscure this large opening.

DE-3 744 831 represents the prior art closest to this invention. It proposes producing a pocket comprising an opening on one of its sides, inserting the core into the pocket and then closing the opening again. To this end, DE-3 744 831 proposes inserting the lips of the opening into a slot formed on the corresponding side of this core and holding these lips in the said slot, connecting them together with the aid of sonotrode following the interposition of strip of plastic material adhering to the said lips. This process has the disadvantage that it requires a lot of technical equipment and, in addition, the strips of plastic material may have flashes spoiling the desired aesthetic appearance of the visor.

The object of this invention is to obviate these disadvantages and to propose a process for covering any type of visor with fabric, with or without a mirror, without the use of complex equipment.

The invention therefore relates to a process for the manufacture of a vehicle visor, of the type comprising a rigid core enclosed in a fabric cover, a process according to which a fabric pocket is produced, comprising on one of its sides an opening defined by lips, the core is inserted into the said pocket through the said opening and the said opening is closed to form the said cover covering the core. The fabric may or may not be coated with a PVC layer or a layer of foam giving it a softer feel.

This problem is solved according to the invention in that the process proposed is characterised in that the lips of the said opening are preferably stiffened before the said core is inserted into the said pocket, and in that the said opening is closed by inserting the said stiffened lips into an appropriate groove provided on the corresponding edge of the said core and extending in the general plane of the visor.

By virtue of the stiffening of the two lips of the opening, these lips can be held in the groove in spite of any tension that may exist in the fabric. They act as hooks holding the two walls of the cover on either side of the groove of the core. In addition, it is easier to position the fabric in the groove by virtue of these elements.

The said lips are preferably stiffened by fixing stiffening elements to at least one of their faces.

The said stiffening elements are advantageously fixed to the inner face of the said pocket, so that they are invisible.

The said stiffening elements preferably consist of a plurality of thin strips disposed horizontally along the lips of the said opening.

The thin strip can be a semi-rigid strip of strong cardboard or of synthetic material, which can be bonded or sewn on to the inner face of the pocket.

Each lip preferably comprises a plurality of stiffening elements, so as to maintain a certain longitudinal elasticity of the lips to facilitate the insertion of the core into the pocket.

This invention also relates to a process for the manufacture of a vehicle visor of the type comprising a rigid core enclosed in a fabric cover and a central fastening system consisting of a rod disposed parallel to one large side of the said visor and traversing a lateral slot provided on the said large side, a process according to which a fabric pocket is produced, comprising on one of its sides an opening defined by lips, the core is inserted into the said pocket through the said opening and the said opening is closed to form the said cover covering the said core.

A number of different processes exist at present for mounting the fastening system on a visor that is not covered with fabric. One of these processes consists in moulding the rod or at least one of the ends thereof at the time of the manufacture of the core. With this process it is not possible to cover the walls forming the slot with fabric without forming a special opening in the pocket for this slot, an opening which would then have to be covered up by a meticulous and expensive operation.

Another known process consists in using a flexible rod, one of the ends of which is inserted into a first housing provided to this end and opening on to the slot, and the other end of which is inserted into a second housing, situated opposite the first, by elastic deformation of the rod. For this process, a rod of small length must be used, which then may not be well anchored in the walls of the core.

The object of this invention is to obviate these disadvantages

This problem is solved according to the invention in that a channel is provided in the core to house the said rod, the said channel opening on to one side of the core via an orifice, and in that, after the insertion of the core into the said pocket, the said fastening system is mounted by slipping the said rod into the said channel through the said orifice.

The opening of the pocket is preferably provided at the side of the core on to which the said channel opens and the said rod is slipped through the said opening before it is closed.

A hollow tube is advantageously placed in the said slot at right angles with the said channel before the said rod is inserted in such a manner that it can support the said tube when it is inserted.

The fabric pocket can of course be closed again according to the process described hereinabove.

Other features and advantages of the invention will be clear from the following description given with reference to the accompanying drawings, in which.

This invention relates to trimming a visor 2 with a textile material, e.g. a woven fabric.

Figure 1:
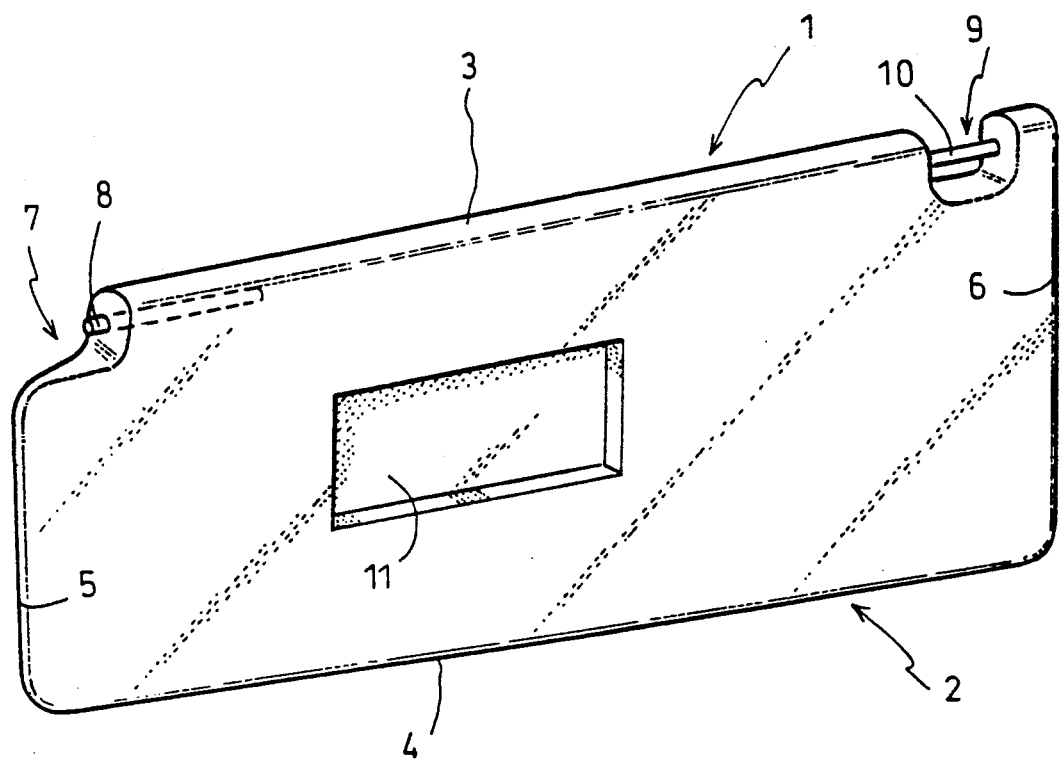
FIG. 1 shows the core of the visor of the invention.

FIG. 1 shows the core 1 of a visor 2 produced by moulding polyurethane foam or some other material and adapted to be enclosed in a fabric cover.

The substantially rectangular core 1 of oblong shape comprises two large sides 3 and 4 and two small lateral sides 5 and 6. It has a notch 7 in the corner defined by the large side 3 and the small side 5. A horizontal channel 8 adapted to house a rod of a supporting arm, not shown in the drawings, opens on to this notch 7. The supporting arm is provided to fix the visor 2 to the roof of the vehicle in such a manner that the visor 2 can pivot about a horizontal axis parallel to the large side 3 and about a vertical axis situated laterally relative to the visor 2.

In addition, on its large side 3, the core 1 has a lateral slot 9 which is at a distance from the notch 7 and is adapted to be traversed by a rod 10 parallel to the large side 3. This rod 10 can cooperate at least temporarily with means provided on the roof of the vehicle, so as to form a central fastening system for the visor 2 so that it can pivot about the horizontal pivot axis. The core 1 may also comprise on one of its faces a cavity 11 adapted to receive a mirror or some other element (illuminated mirror, pocket, etc.) after trimming of the core 1.

Figure 2:
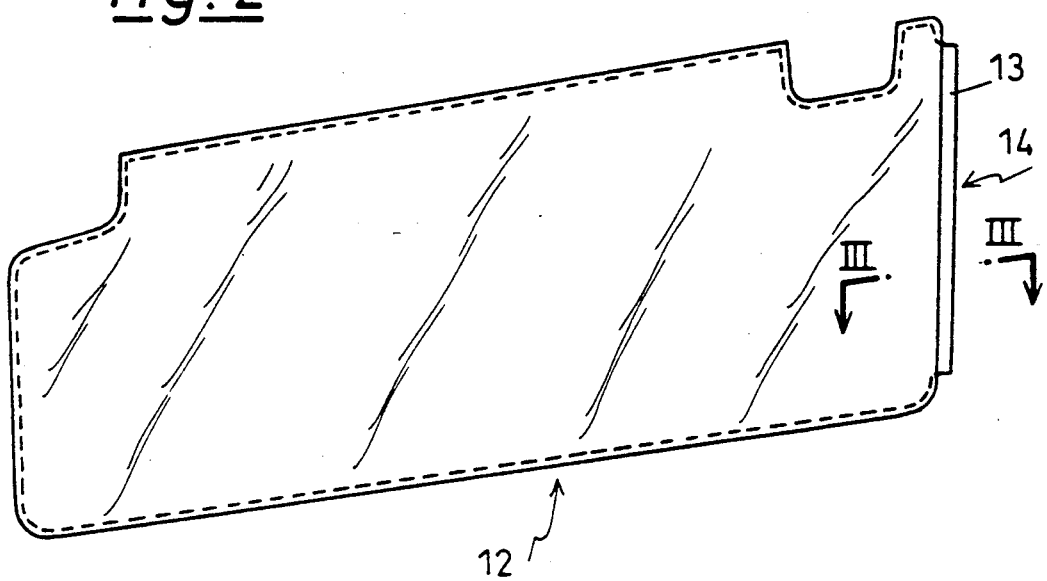
FIG. 2 shows a fabric pocket adapted to trim the core of FIG. 1.

FIG. 2 shows a fabric pocket 12 which comprises on one of its sides 13 an opening 14 defined by two lips 15 and 16. The dimensions of the pocket 12 are adapted to those of the core 1 and the opening 14 is sufficiently large for the insertion of the core 1 into the interior of the pocket 12. A map holder (or visor pouch) can also be sewn on to this pocket 12.

The pocket 12 is produced in the known manner by superimposing the two sections of fabric 17 and 18 which are to cover the faces of the core 1 in such a manner that the outer faces of the sections 17 and 18 are joined edge to edge, by sewing together three edges of these sections 17 and 18 so as to form the opening 14 on the side 13 and turning the pocket 12 inside out so that the seams produced are in the inside of the pocket 12.

Once the core 1 has been inserted into the pocket 12, it only remains to close this opening 14.

To this end, the lips 15 and 16 defining the opening 14 are stiffened over a certain width from the edge of the opening 14.

Figure 3:
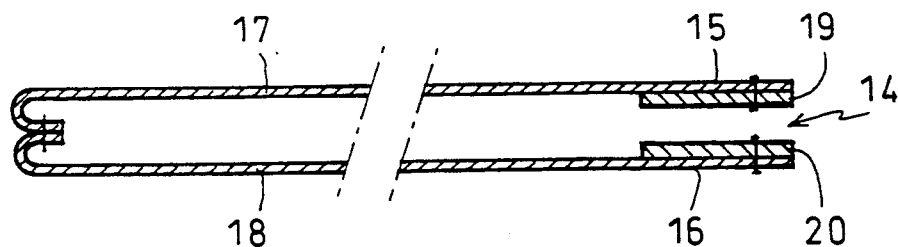
FIG. 3 is a transverse section of the opening of the pocket along the line III—III of FIG. 2.

FIG. 3 shows a transverse section of the pocket 12 at right angles with the opening 14. Semi-rigid thin strips 19 and 20 are fixed to the lips 15 and 16 of the sections 17 and 18 by sewing or bonding. These thin strips 19 and 20 preferably extend along the entire length of the lips 15 and 16 and they are formed either in one single piece or by the juxtaposition of a plurality of thin strips, thereby giving the pocket 12 a certain elasticity at the opening 14, so as to facilitate the insertion of the core 1 into the interior of the pocket 12. The thin strips 19 and 20 are taken from a flat strip of cardboard or of plastic material.

On its side close to the opening 14 of the pocket 12, the core 1 has a longitudinal groove 21 which extends substantially in the median plane of the core 1.

Figure 4:
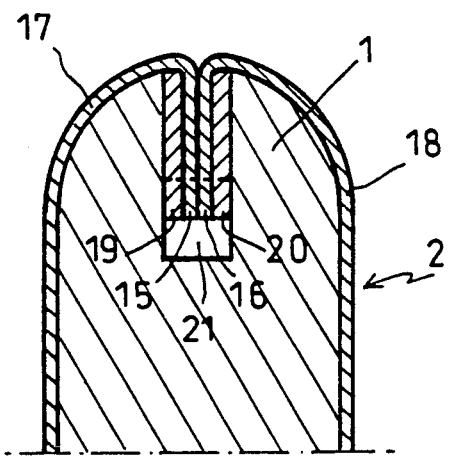
FIG. 4 is a transverse section of one side of the trimmed visor, this section being produced on the side of the visor corresponding to the opening of the fabric pocket.

The groove 21 has a depth and a thickness adapted to receive the stiffened lips 15 and 16 via the thin strips 19 and 20, as can be seen in FIG. 4. The stiffened lips 15 and 16 are inserted into the groove 21 manually by drawing out the sections of fabric 17 or 18 in succession and turning the corresponding lip 15 or 16 inside out so that it is situated in front of the groove 21. Each thin strip 19 or 29 is held firmly in the groove 21 by virtue of the elasticity of the fabric, and the corresponding edge of the visor has an attractive aesthetic appearance.

Figure 5:
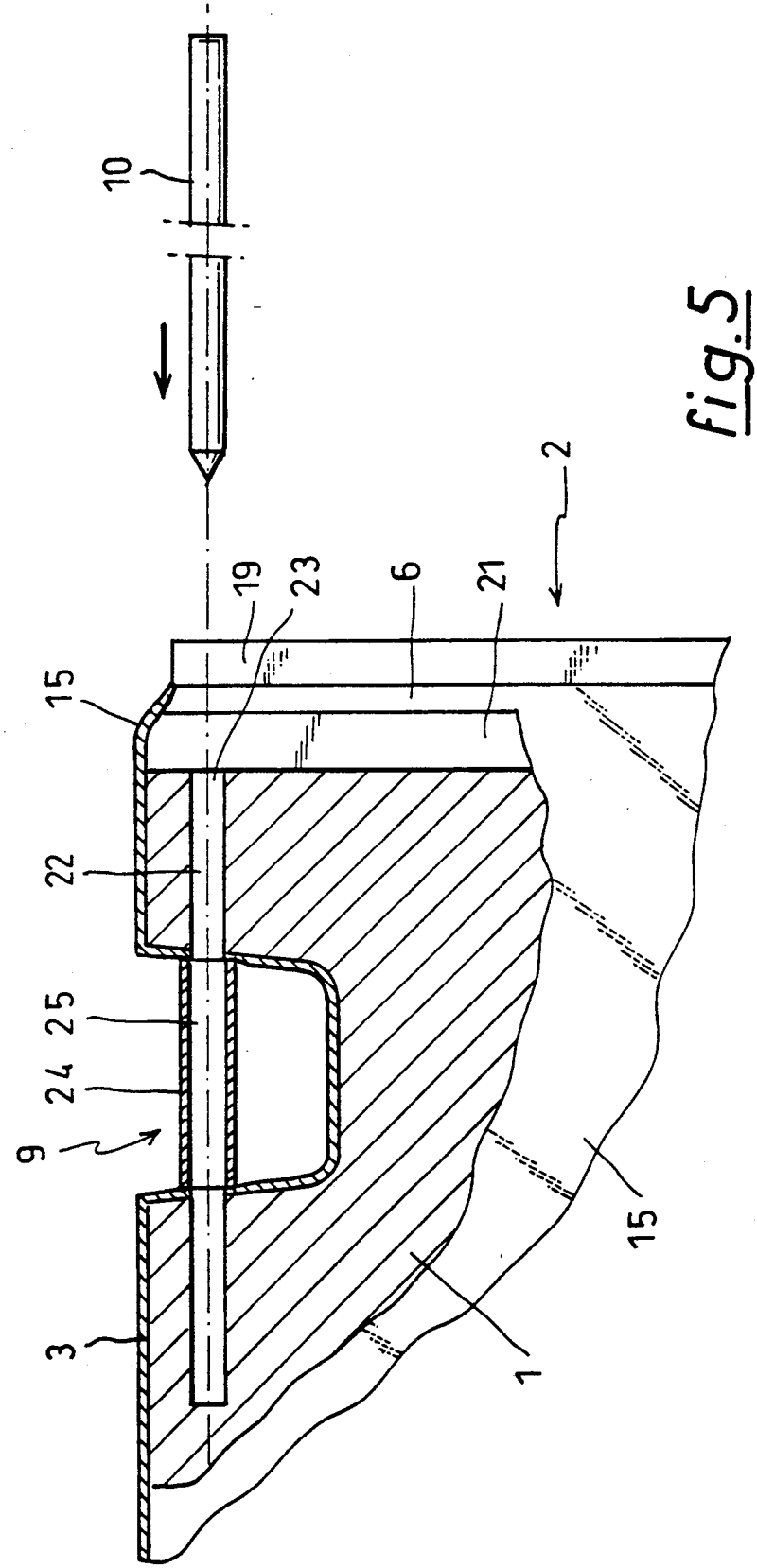
FIG. 5 is a section along the median plane of the core, showing the process for mounting the central fastening system.

FIG. 5 shows the method of mounting the central fastening system formed by the rod 10 which is to traverse the lateral slot 9. The core 1 is provided with a channel 22 which opens on to the side 6 via an orifice 23.

The channel 22 is parallel to the large side 3. It is extended above the lateral slot 9 and it has a length slightly greater than the length of the rod 10.

The rod 10 is slipped into the channel 22 through the orifice 23 once the core 1 has been inserted into the fabric pocket 12. It should be noted that the channel 22 is not necessary if the foam is sufficiently friable for insertion of the rod 10.

A tube 24 can be provided between the walls of the slot 9 in such a manner that its inner cavity 25 can be traversed by the rod 10. The rod 10 has a length sufficient to pass right through the lateral slot 9 when it is inserted into the channel 22. The rod 21 may have a point at one of its ends to pierce the fabric at right angles with the slot 9. By virtue of the presence of the tube 24 it is possible to conceal the fraying caused by the piercing of the fabric and it is also possible for the fastening axis diameter to be different from that of the rod 10.

The opening 14 of the pocket 12 is preferably provided on the side of the pocket corresponding to the small side 6 of the core 1 and the rod 10 is slipped into the channel 22 through the opening 14 of the pocket 12, before closure thereof.

The pocket 12 used for the implementation of the processes described hereinabove can be adapted for auxiliary functions of the visor. In particular, the pocket 12 may comprise additional openings, e.g. for fixing a mirror in the cavity 11, or for the passage of a power supply.

It can also be provided on one of its faces with a transverse strip forming a map holder, and can be reinforced by a PVC film.

I claim:

1. In a process for the manufacture of a vehicle visor (2) of the type comprising a rigid core (1) enclosed in a fabric cover, said cover being formed into a fabric pocket (12) having on one of its sides (13) an opening (14) defined by lips (15, 16), the core (1) being inserted into said pocket (12) through said opening (14), and said opening (14) being closed to form said cover enclosing said core (1), the improvement comprising the steps of stiffening the lips (15, 16) of said opening (14) before said core (1) is inserted into said pocket (12), providing on said core (1) on the side thereof disposed adjacent said lips when said cover is inserted into said pocket, a groove (21), and inserting said stiffened lips (15, 16) into said groove (21) to close said opening (14).

2. The process according to claim 1 wherein said lips (15, 16) have faces on sides of each thereof, and wherein said stiffening step is carried out by attaching stiffening elements (19, 20) to at least one of said faces.

3. The process according to claim 2 wherein said stiffening step is carried out by attaching said stiffening elements (19, 20) to the faces of said pocket (12) on the inside thereof.

4. The process according to claim 3 wherein said stiffening step is carried out by locating thin strips which provide said stiffening elements horizontally along the lips (15, 16) of said opening (14).

5. The process according to claim 2 wherein said stiffening step is carried out with the aid of stiffening elements (19, 20) which maintain a certain longitudinal elasticity of the lips (15, 16) to facilitate the insertion of the core (1) into the pocket (12).

6. The process according to claim 1 wherein the visor comprises a central fastening system having a rod (10) disposed parallel to one edge (3) of said visor which edge extends along the length thereof and between the ends thereof traversing a lateral slot (9) formed on said edge (3), and further comprising the steps of forming in said core between opposite ends (5, 6) thereof a channel (22) opening onto one of said ends (6), providing an orifice (23) in said core (1), and after inserting the core (1) into the pocket (12), mounting said fastening system by slipping said rod (10) into said channel (22) through said orifice (23).

7. The process according to claim 6 wherein the opening (14) of the pocket (12) is provided at the side (6) of the core (1) onto which the channel (22) opens, and said mounting step is carried out by slipping said rod (10) through said opening (14) before it is closed.

8. The process according to claim 6 further comprising the step of placing a hollow tube (24) in said slot (9) so that said tube makes a right angle with said channel (22) before said rod (10) is inserted whereby said tube (24) supports said rod when it is inserted.

* * * * *